US012581121B2

(12) United States Patent
Yang

(10) Patent No.: US 12,581,121 B2
(45) Date of Patent: ***Mar. 17, 2026

(54) DEVICE AND METHOD FOR ENCODING VIDEO DATA USING MAXIMUM BIT-DEPTH CONSTRAINT INFORMATION

(71) Applicant: SHARP KABUSHIKI KAISHA, Sakai (JP)

(72) Inventor: Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 22 days.

This patent is subject to a terminal disclaimer.

(21) Appl. No.: 18/649,341

(22) Filed: Apr. 29, 2024

(65) Prior Publication Data

US 2024/0283980 A1 Aug. 22, 2024

Related U.S. Application Data

(63) Continuation of application No. 17/967,164, filed on Oct. 17, 2022, now Pat. No. 12,003,780, which is a continuation of application No. 17/337,661, filed on Jun. 3, 2021, now Pat. No. 11,523,137.

(60) Provisional application No. 63/036,917, filed on Jun. 9, 2020.

(51) Int. Cl.
*H04N 19/70* (2014.01)
*H04N 19/184* (2014.01)
*H04N 19/186* (2014.01)

(52) U.S. Cl.
CPC ........... *H04N 19/70* (2014.11); *H04N 19/184* (2014.11); *H04N 19/186* (2014.11)

(58) Field of Classification Search
CPC .... H04N 19/70; H04N 19/184; H04N 19/186; H04N 19/61
USPC ...................................................... 375/240.01
See application file for complete search history.

(56) References Cited

U.S. PATENT DOCUMENTS

| | | | | |
|---|---|---|---|---|
| 10,264,285 | B2 * | 4/2019 | Joshi | H04N 19/182 |
| 12,003,780 | B2 * | 6/2024 | Yang | H04N 19/186 |
| 2014/0086333 | A1 * | 3/2014 | Wang | H04N 21/235 |
| | | | | 375/240.26 |
| 2014/0086336 | A1 * | 3/2014 | Wang | H04N 19/31 |
| | | | | 375/240.26 |
| 2015/0010068 | A1 * | 1/2015 | Francois | H04N 19/88 |
| | | | | 375/240.08 |

(Continued)

OTHER PUBLICATIONS

Jianle Chen et al., "Algorithm description for Versatile Video Coding and Test Model 8 (VTM 8)", JVET-Q2002-v3, Joint Video Experts Team (JVET) of ITU-T SG 16 WP 3 and ISO/IEC JTC 1/SC 29/WG 11, 17th Meeting: Brussels, BE, Jan. 7-17, 2020.

(Continued)

*Primary Examiner* — Marnie A Matt
(74) *Attorney, Agent, or Firm* — ScienBiziP, P.C.

(57) ABSTRACT

A method of encoding video data performed by an electronic device is provided. The method receives the video data. The method further determines, for general constraints information of the video data, a maximum constraint indication used for determining a maximum value of a parameter included in a sequence parameter set (SPS) for the video data. The maximum constraint indication does not impose a constraint on the maximum value of the parameter when the maximum constraint indication is equal to zero.

16 Claims, 5 Drawing Sheets

(56) References Cited

U.S. PATENT DOCUMENTS

| | | | | |
|---|---|---|---|---|
| 2015/0373344 A1* | 12/2015 | Wang | .................... | H04N 19/31 |
| | | | | 375/240.02 |
| 2016/0295217 A1* | 10/2016 | Suzuki | ................ | H04N 19/115 |
| 2017/0006289 A1* | 1/2017 | Alshina | ................. | H04N 19/14 |
| 2017/0085891 A1* | 3/2017 | Seregin | ............... | H04N 19/182 |
| 2019/0089959 A1* | 3/2019 | Berry | ................. | H04N 19/463 |
| 2021/0385496 A1* | 12/2021 | Yang | .................... | H04N 19/70 |
| 2024/0283980 A1* | 8/2024 | Yang | ................... | H04N 19/186 |

OTHER PUBLICATIONS

Benjamin Bross et al., "Versatile Video Coding (Draft 9)", JVET-R2001-vA, Joint Video Experts Team (JVET) of ITU-T SG 16 WP 3 and ISO/IEC JTC 1/SC 29/WG 11, 18th Meeting: by teleconference, Apr. 15-24, 2020.

* cited by examiner

DEVICE AND METHOD FOR ENCODING VIDEO DATA USING MAXIMUM BIT-DEPTH CONSTRAINT INFORMATION

CROSS-REFERENCE TO RELATED APPLICATION(S)

This application is a continuation application of U.S. patent application Ser. No. 17/967,164, filed on Oct. 17, 2022, which is a continuation application of U.S. patent application Ser. No. 17/337,661, filed on Jun. 3, 2021, issued as U.S. Pat. No. 11,523,137, which claims the benefit of and priority to U.S. Provisional Patent Application Ser. No. 63/036,917, filed on Jun. 9, 2020, the contents of all of which are hereby incorporated herein fully by reference in their entirety for all purposes.

FIELD

The present disclosure is generally related to video coding and, more specifically, to techniques for using a constraint indication in general constraints information for a parameter in a parameter set.

BACKGROUND

In a conventional video coding method, an encoder may encode video data to generate encoded data having multiple flags and multiple indices for multiple pictures and provide the encoded data to a decoder. The flags and the indices may be included in a video parameter set (VPS), a sequence parameter set (SPS), a picture parameter set (PPS), a picture header (PH), a slice header (SH), a tile header (TH), or a coding-unit-based syntax element. In addition, a new syntax structure referred to as general constraints information (GCI) and included in the encoded data further contains a list of constraint flags and non-flag syntax elements indicating specific constraint properties of the pictures. The constraint flags may be equal to one or zero for indicating whether constraints are imposed on the pictures. The number of multiple candidate values for one of the current non-flag syntax elements in GCI may be greater than two for indicating more than one constraint condition.

However, one of the constraint conditions indicated by one of the candidate values of the current non-flag syntax element in GCI may be also indicated by the other candidate values of the current non-flag syntax element in GCI. In other words, the number of the candidate values may be greater than the number of the constraint condition, so the candidate values of the current non-flag syntax elements in GCI may include multiple redundant values. Furthermore, a specific candidate value indicating that there is no constraint imposed on the pictures may be much greater than zero, so the decoding efficiency may be low since the decoder needs to check each bits of the current non-flag syntax element one by one to determine whether the constraint is imposed. Therefore, the encoder and the decoder need to have a method for more efficiently using the candidate values of the current non-flag syntax elements in GCI.

SUMMARY

The present disclosure is directed to a device and method for using a constraint indication in general constraints information for a parameter in a parameter set.

In a first aspect of the present disclosure, a method of decoding a bitstream and an electronic device for performing the method are provided. The method includes receiving the bitstream; and determining, from general constraints information in the bitstream, a maximum constraint indication used for determining a maximum value of a parameter indication included in a sequence parameter set (SPS) of the bitstream, wherein the maximum constraint indication does not impose a constraint on the maximum value of the parameter indication when the maximum constraint indication is equal to zero.

In a second aspect of the present disclosure, a method for decoding a bitstream and an electronic device for performing the method are provided. The method includes receiving the bitstream; determining, from a sequence parameter set (SPS) of the bitstream, a parameter indication indicating a picture parameter of multiple image frames in a video sequence; and determining, from general constraints information in the bitstream, a maximum constraint indication, wherein the maximum constraint indication does not impose a constraint on the parameter indication when the maximum constraint indication is equal to zero.

In a third aspect of the present disclosure, a method of decoding a bitstream and an electronic device for performing the method are provided. The method includes receiving the bitstream; and determining, from the bitstream, a maximum constraint indication used for determining a maximum value of a bit-depth indication sps_bitdepth_minus8 included in a sequence parameter set (SPS) of the bitstream when the maximum constraint indication is a maximum bit-depth constraint indication, wherein the maximum constraint indication does not impose a constraint on the maximum value of the bit-depth indication sps_bitdepth_minus8 when the maximum constraint indication is equal to zero.

In a fourth aspect of the present disclosure, a method for decoding a bitstream and an electronic device for performing the method are provided. The method includes receiving the bitstream; determining, from a sequence parameter set (SPS) of the bitstream, a bit-depth indication sps_bitdepth_minus8 indicating a bit-depth parameter of multiple image frames in a video sequence; and determining, from the bitstream, a maximum bit-depth constraint indication, wherein the maximum bit-depth constraint indication does not impose a constraint on the bit-depth indication sps_bit-depth_minus8 when the maximum bit-depth constraint indication is equal to zero.

In a fifth aspect of the present disclosure, a method of encoding video data and an electronic device for performing the method are provided. The method includes receiving the video data; and determining, for general constraints information of the video data, a maximum constraint indication used for determining a maximum value of a parameter included in a sequence parameter set (SPS) for the video data, wherein the maximum constraint indication does not impose a constraint on the maximum value of the parameter when the maximum constraint indication is equal to zero.

In a sixth aspect of the present disclosure, a method for encoding video data and an electronic device for performing the method are provided. The method includes receiving the video data; determining, for encoding into a sequence parameter set (SPS) of a bitstream, a parameter indicating a picture parameter of a plurality of image frames in a video sequence of the video data; and determining, for encoding into general constraints information of the bitstream, a maximum constraint indication, wherein the maximum constraint indication does not impose a constraint on the parameter when the maximum constraint indication is equal to zero.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
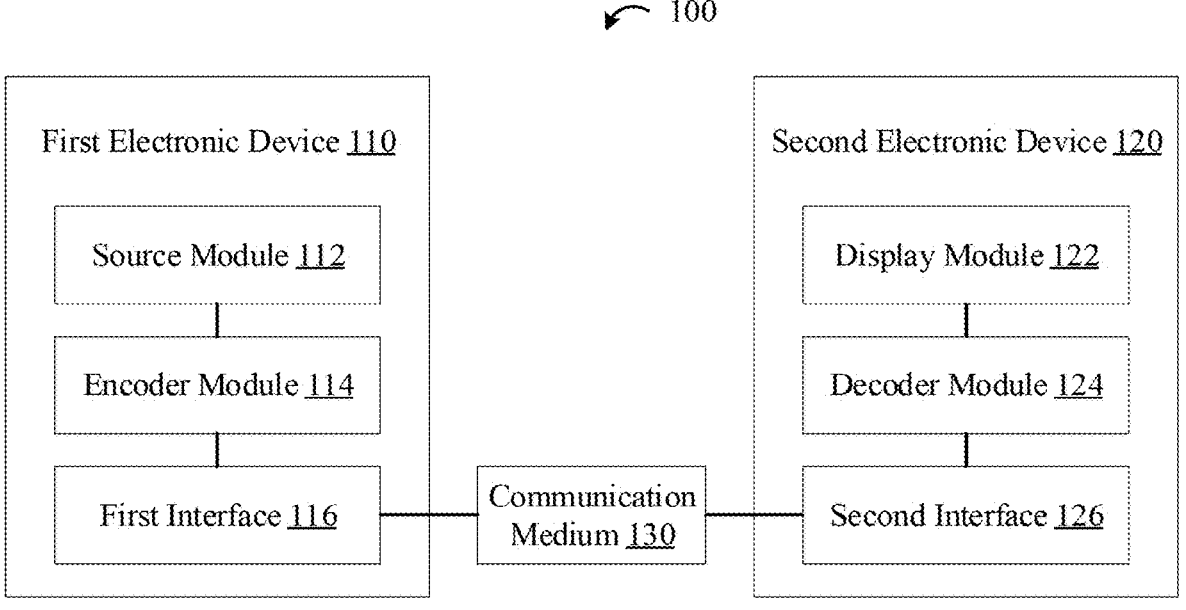
FIG. 1 is a block diagram illustrating a system having a first electronic device and a second electronic device for encoding and decoding video data, in accordance with one or more example implementations of the present disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of the present disclosure. The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
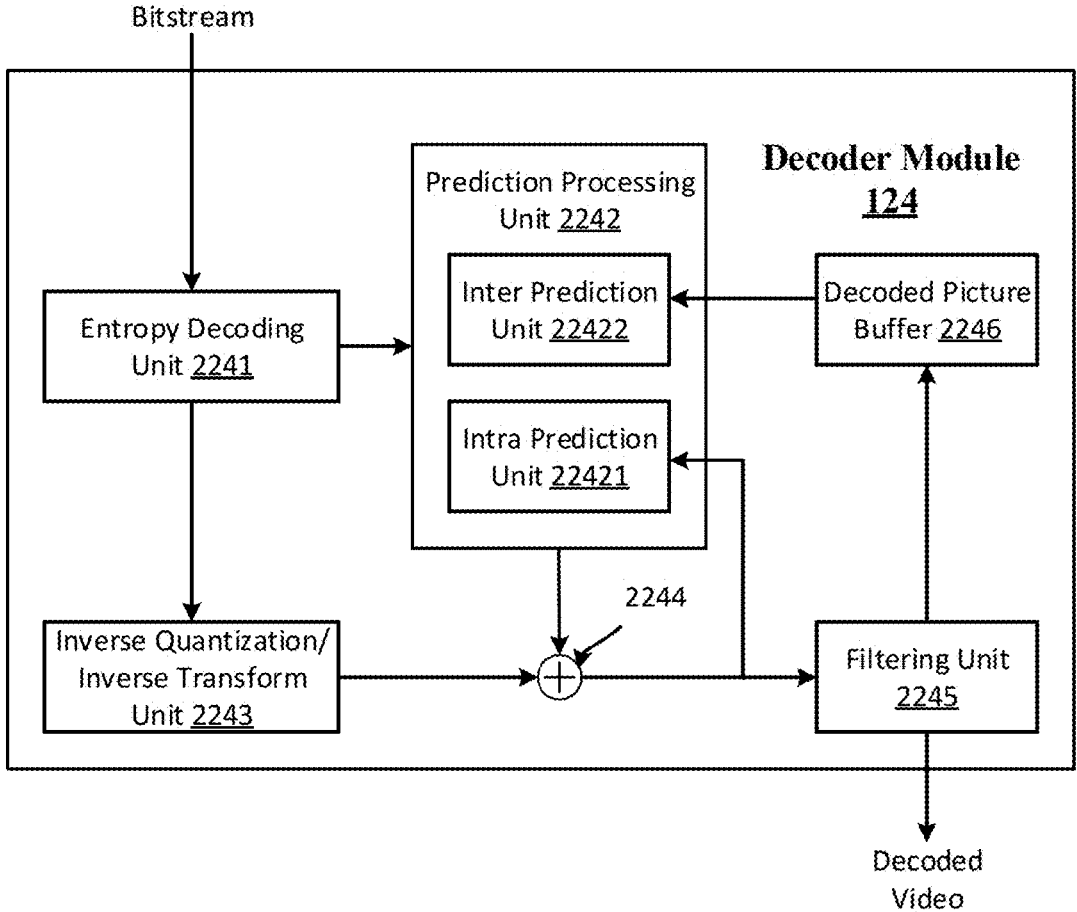
FIG. 2 is a block diagram illustrating a decoder module of the second electronic device illustrated in FIG. 1, in accordance with one or more example implementations of the present disclosure.

FIG. 2 is a block diagram illustrating a decoder module 124 of the second electronic device 120 illustrated in FIG. 1, in accordance with one or more example implementations of the present disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components are reconstructed by the prediction processing unit 2242.

The intra prediction unit 22421 may reconstruct multiple chroma components of the current block unit based on the multiple luma components of the current block unit when the multiple luma components of the current block unit are reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
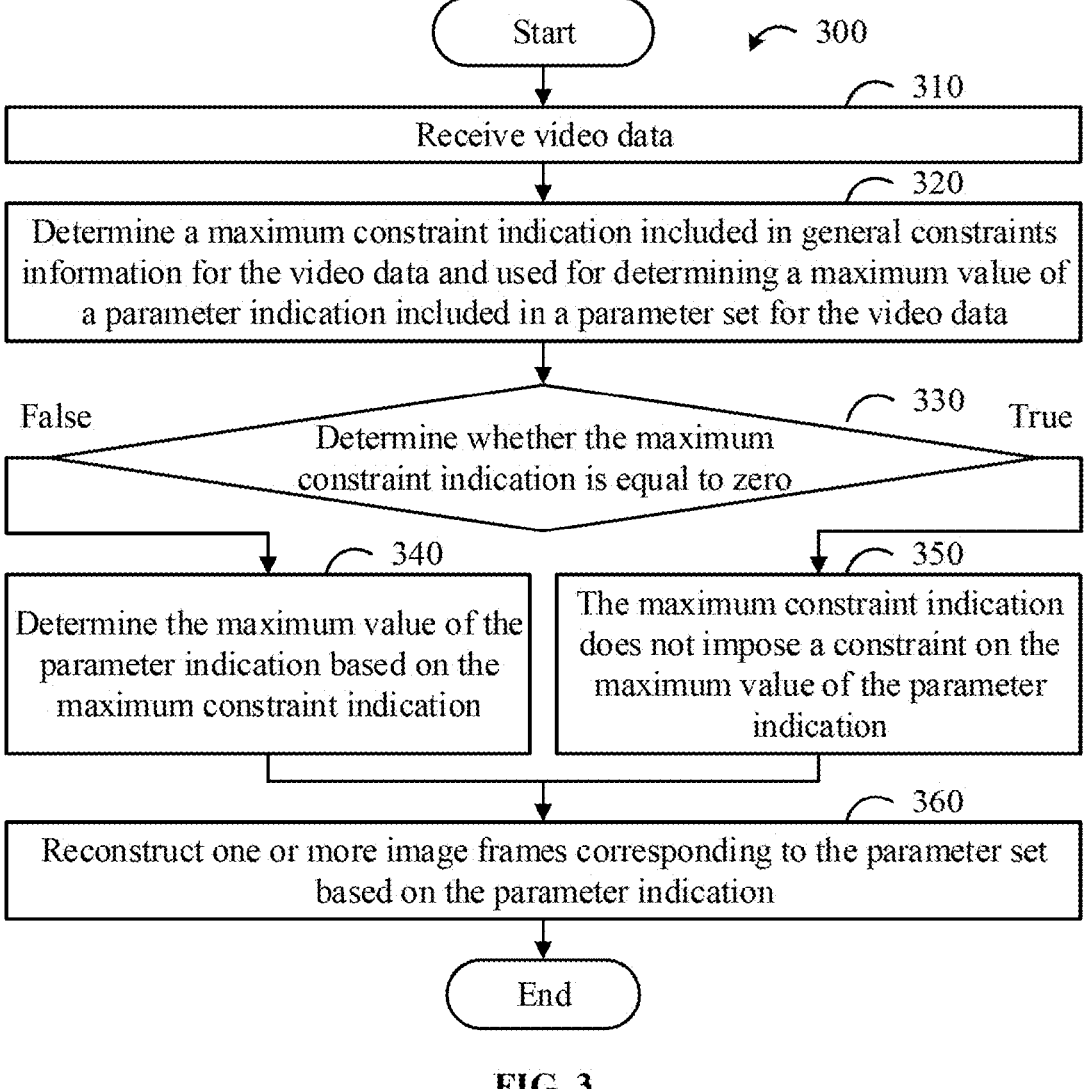
FIG. 3 is a flowchart illustrating a method/process for decoding and/or encoding video data by an electronic device, in accordance with one or more example implementations of the present disclosure.

FIG. 3 is a flowchart illustrating a method/process 300 for decoding and/or encoding video data by an electronic device, in accordance with one or more example implementations of the present disclosure. The method/process 300 is an example implementation, as there are a variety of methods of decoding the video data.

The method/process 300 may be performed by an electronic device using the configurations illustrated in FIGS. 1 and 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus may be different from what is illustrated. Additional blocks may be added or fewer blocks may be utilized without departing from the scope of the present disclosure.

At block 310, the method/process 300 may start by the decoder module 124 receiving the video data. The video data received by the decoder module 124 may include a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine multiple prediction indications and multiple partitioning indications for multiple video images. Then, the decoder module 124 may further reconstruct the multiple video images based on the prediction indications and the partitioning indications. The prediction indications and the partitioning indications may include multiple flags and multiple indices.

In addition, the entropy decoding unit 2241 may further decode the bitstream to determine multiple constraint indications for determining multiple constraint conditions on the multiple prediction indications and the multiple partitioning indications.

At block 320, the decoder module 124 determines a maximum constraint indication included in general constraints information for the video data and used for determining a maximum value of a parameter indication included in a parameter set for the video data.

The decoder module 124 may determine the parameter indication included in the parameter set of the bitstream and indicating a picture parameter of the image frames included in the bitstream. The parameter set may be one of a video parameter set (VPS), a sequence parameter set (SPS), a picture parameter set (PPS), and a picture header (PH). When the parameter set is the VPS, the parameter indication may be one of multiple video indications of one or more image frames, corresponding to the VPS, in the bitstream. When the parameter set is the SPS, the parameter indication may be one of multiple sequence indications of one or more image frames in a video sequence corresponding to the SPS. When the parameter set is the PPS, the parameter indication may be one of multiple picture indications of one or more image frames corresponding to the PPS. When the parameter set is the PH, the parameter indication may be one of multiple header indications of one or more image frames corresponding to the PH. The parameter indication may be one of the prediction indications or one of the partitioning indications included in the parameter set.

The parameter indication may be a bit-depth indication in the SPS. The bit-depth indication may indicate a bit-depth of multiple image samples in each of a luma array and a chroma array. The bit-depth indication may be a first SPS indication sps_bitdepth_minus8. Therefore, the bit-depth of the multiple image samples may be the picture parameter derived by adding eight to the first SPS indication sps_bitdepth_minus8.

The parameter indication may be a chroma format indication in the SPS. The chroma format indication may indicate a chroma sampling structure of the chroma array. The chroma sampling structure may be the picture parameter of the chroma format indication. The chroma format indication may be a second SPS indication sps_chroma_format_idc. Therefore, a location relationship between multiple luma samples and multiple chroma samples may be derived based on the second SPS indication sps_chroma_format_idc.

The decoder module 124 may determine the maximum constraint indication included in the general constraints information (GCI) of the bitstream. The constraint indications included in the GCI may be multiple general constraint indications each indicating that one of different constraints is imposed on the video data or that there is no constraint imposed on the video data. Multiple indication values of the multiple general constraint indications may indicate different constraint conditions for the bitstream. The maximum constraint indication may be one of the general constraint indications and the multiple indication values of the maximum constraint indication may indicate different maximum values of the parameter indication included in the parameter set. Therefore, the maximum constraint indication may be used to determine the maximum value of the parameter indication included in the parameter set.

The maximum constraint indication may be a maximum bit-depth constraint indication in the GCI. The maximum bit-depth constraint indication may indicate a maximum value of the bit-depth indication. For example, the maximum bit-depth constraint indication may be one of a first maximum bit-depth constraint indication gci_max_bitdepth_minus8_constraint_idc_plus1 and a second maximum bit-depth constraint indication gci_sixteen_minus_max_bitdepth_constraint_idc. Thus, the maximum value of the bit-depth indication sps_bitdepth_minus8 may be derived based on the maximum bit-depth constraint indication.

The maximum constraint indication may be a maximum chroma format constraint indication in the GCI. The maximum chroma format constraint indication may indicate a maximum value of the chroma format indication. For example, the maximum chroma format constraint indication may be one of a first maximum chroma format constraint indication gci_max_chroma_format_constraint_idc_plus1 and a second maximum chroma format constraint indication gci_three_minus_max_chroma_format_constraint_idc. The maximum value of the chroma format indication sps_chroma_format_idc may be derived based on the maximum chroma format constraint indication.

At block 330, the decoder module 124 determines whether the maximum constraint indication is equal to zero. The method 300 may proceed to block 340 when the decoder module 124 determines that the maximum constraint indication is not equal to zero. The method 300 may proceed to block 350 when the decoder module 124 determines the maximum constraint indication is equal to zero.

The decoder module 124 determines an indication value of the maximum constraint indication. Since the maximum constraint indication is used for determining the maximum value of the parameter indication, the decoder module 124 may determine the maximum value of the parameter indication based on the indication value of the maximum constraint indication.

The indication value of the maximum constraint indication may be in a range of 0 to a maximum indication number. When the indication value of the maximum constraint indication is equal to zero, the maximum constraint indication may not impose the constraint on the parameter indication. When the indication value of the maximum constraint indication is greater than zero and less than or equal to the maximum indication number, the maximum constraint indication may impose a corresponding constraint on the parameter indication. In addition, the maximum indication number may be equal to the number of the constraint condition, so there may be no redundant values for the maximum constraint indication. Furthermore, the maximum constraint indication equal to zero specifies no constraint. Thus, the decoding efficiency may be increased since the decoder may simultaneously check each bit of the maximum constraints indication to directly determine whether each bit of the maximum constraints indication is equal to zero.

When the maximum constraint indication is the maximum bit-depth constraint indication, the indication value of the maximum bit-depth constraint indication may be in the range of zero to eight. In other words, the maximum indication number is equal to eight. In addition, when the indication value of the maximum bit-depth constraint indication is equal to zero, the maximum bit-depth constraint indication may not impose the constraint on the bit-depth indication in the parameter set. When the indication value of the maximum bit-depth constraint indication is greater than zero and less than or equal to eight, the maximum bit-depth constraint indication may impose a corresponding constraint on the bit-depth indication in the parameter set.

When the maximum constraint indication is the maximum chroma format constraint indication, the indication value of the maximum chroma format constraint indication may be in the range of zero to the maximum indication number. In addition, when the indication value of the maximum chroma format constraint indication is equal to zero, the maximum chroma format constraint indication may not impose the constraint on the chroma format indication in the parameter set. When the indication value of the maximum chroma format constraint indication is greater than zero and less than or equal to the maximum indication number, the maximum chroma format constraint indication may impose a corresponding constraint on the chroma format indication in the parameter set.

At block 340, the decoder module 124 determines the maximum value of the parameter indication based on the maximum constraint indication. When the indication value of the maximum constraint indication is greater than zero, the decoder module 124 may determine the maximum value of the parameter indication of the image frames based on the maximum constraint indication.

When the maximum constraint indication is the first maximum bit-depth constraint indication gci_max_bitdepth_minus8_constraint_idc_plus1, the decoder module 124 may derive the maximum value of the first SPS indication sps_bitdepth_minus8 by subtracting one from the indication value of the first maximum bit-depth constraint indication. Then, the decoder module 124 may ensure that a parameter value of the first SPS indication of the image frames included in the video sequence corresponding to the SPS is less than or equal to the derived maximum value.

When the maximum constraint indication is the second maximum bit-depth constraint indication gci_sixteen_minus_max_bitdepth_constraint_idc, the decoder module 124 may derive the maximum value of the first SPS indication sps_bitdepth_minus8 by subtracting the indication value of the first maximum bit-depth constraint indication from sixteen. Then, the decoder module 124 may ensure that the parameter value of the first SPS indication of the image frames included in the video sequence corresponding to the SPS is less than or equal to the derived maximum value.

When the maximum constraint indication is the first maximum chroma format constraint indication gci_max_chroma_format_constraint_idc_plus1, the decoder module 124 may derive the maximum value of the second SPS indication sps_chroma_format_idc by subtracting one from the indication value of the first maximum chroma format constraint indication. Then, the decoder module 124 may ensure that a parameter value of the second SPS indication of the image frames included in the video sequence corresponding to the SPS is less than or equal to the derived maximum value.

When the maximum constraint indication is the second maximum chroma format constraint indication gci_three_minus_max_chroma_format_constraint_idc, the decoder module 124 may derive the maximum value of the second SPS indication sps_chroma_format_idc by subtracting the indication value of the second maximum chroma format constraint indication from three. Then, the decoder module 124 may ensure that the parameter value of the second SPS indication of the image frames included in the video sequence corresponding to the SPS is less than or equal to the derived maximum value.

At block 350, the decoder module 124 determines that the maximum constraint indication does not impose a constraint on the maximum value of the parameter indication. When the indication value of the maximum constraint indication is equal to zero, the decoder module 124 may determine that the indication value of the maximum constraint indication may not influence the maximum value of the parameter indication of the image frames.

When the indication value of the maximum bit-depth constraint indication is equal to zero, the decoder module 124 may determine that the indication value of the maximum bit-depth constraint indication may not influence the maximum value of the bit-depth indication of the image frames in the video sequence corresponding to the SPS. Thus, the maximum bit-depth constraint indication does not impose a constraint on the maximum value of the bit-depth indication in the SPS.

When the indication value of the maximum chroma format constraint indication is equal to zero, the decoder module 124 may determine that the indication value of the maximum chroma format constraint indication may not influence the maximum value of the chroma format indication of the image frames in the video sequence corresponding to the SPS. Thus, the maximum chroma format constraint indication does not impose a constraint on the maximum value of the chroma format indication in the SPS.

At block 360, the decoder module 124 reconstructs one or more image frames corresponding to the parameter set based on the parameter indication.

When the parameter set is the VPS, all of the one or more image frames in the video data are reconstructed based on the parameter indication included in the VPS. When the parameter set is the SPS, the one or more image frames included in the video sequence are reconstructed based on the parameter indication included in the SPS. When the parameter set is the PPS, the one or more image frames corresponding to the PPS are reconstructed based on the parameter indication included in the PPS. When the parameter set is the PH, the one or more image frames corresponding to the PH are reconstructed based on the parameter indication included in the PH.

When the parameter indication is the bit-depth indication in the SPS, the image frames in the video sequence may be reconstructed based on the bit-depth indication. When the parameter indication is the chroma format indication in the SPS, the one or more image frames in the video sequence may be reconstructed based on the chroma format indication. The method/process 300 may then end.

Figure 4:
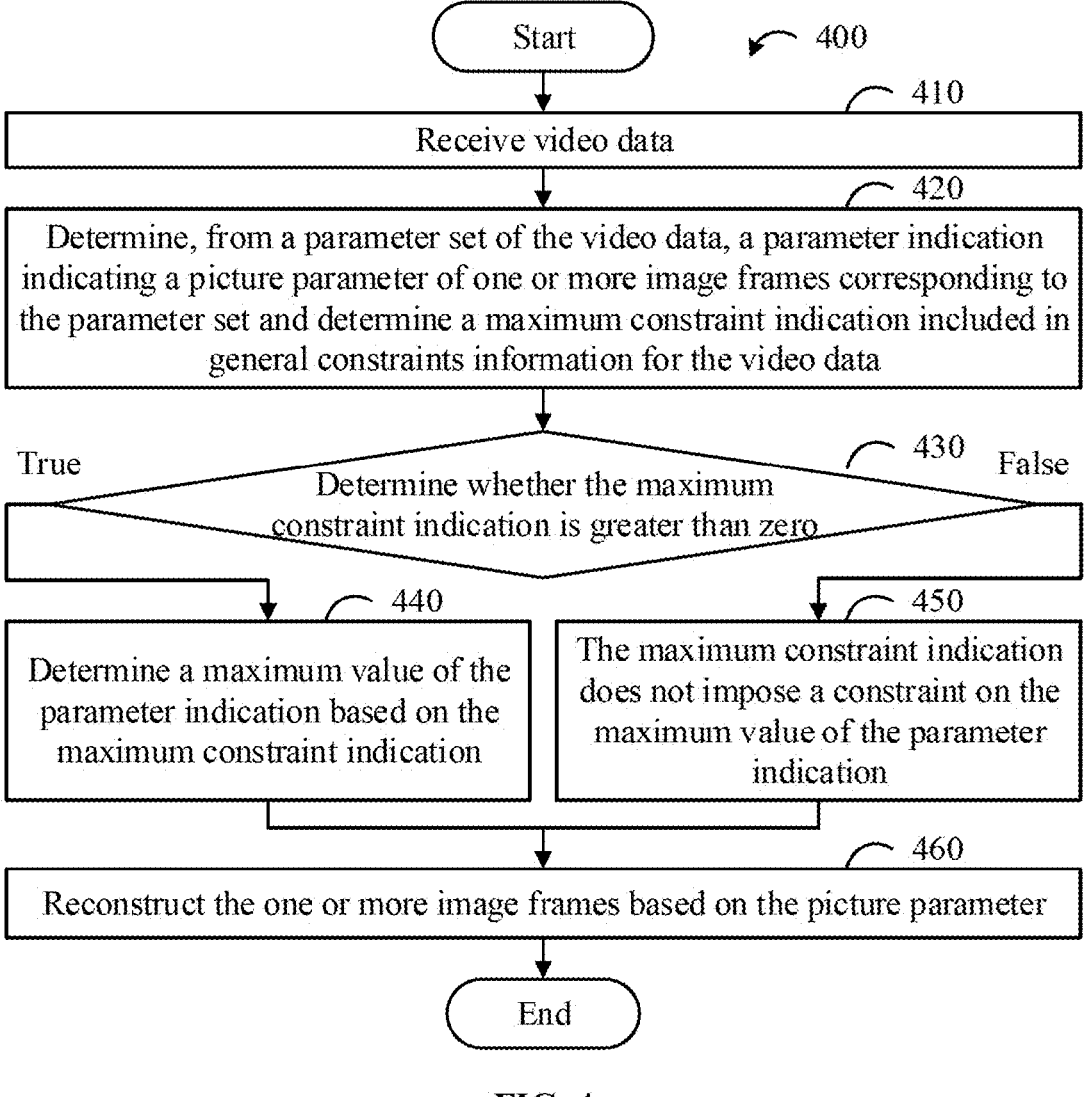
FIG. 4 is a flowchart illustrating another method/process for decoding and/or encoding video data by an electronic device, in accordance with one or more example implementations of the present disclosure.

FIG. 4 is a flowchart illustrating a method/process 400 for decoding and/or encoding video data by an electronic device, in accordance with one or more example implementations of the present disclosure. The method/process 400 is an example implementation, as there are a variety of methods of decoding the video data.

The method/process 400 may be performed by an electronic device using the configurations illustrated in FIGS. 1 and 2, where various elements of these figures may be referenced to describe the method/process 400. Each block illustrated in FIG. 4 may represent one or more processes, methods, or subroutines performed by an electronic device.

The order in which the blocks appear in FIG. 4 is for illustration only, and may not be construed to limit the scope of the present disclosure, thus may be different from what is illustrated. Additional blocks may be added or fewer blocks may be utilized without departing from the scope of the present disclosure.

At block 410, the method/process 400 may start by the decoder module 124 receiving the video data. The video data received by the decoder module 124 may include a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine multiple prediction indications and multiple partitioning indications for multiple image frames. Then, the decoder module 124 may further reconstruct the multiple image frames based on the prediction indications and the partitioning indications.

In addition, the entropy decoding unit 2241 may further decode the bitstream to determine multiple constraint indications for determining multiple constraint conditions on the multiple prediction indications and the multiple partitioning indications.

At block 420, the decoder module 124 determines, from a parameter set of the video data, a parameter indication indicating a picture parameter of one or more image frames corresponding to the parameter set and determines a maximum constraint indication included in general constraints information for the video data.

The decoder module 124 may determine the parameter indication included in the parameter set of the bitstream and indicating a picture parameter of the one or more image frames included in the bitstream. The parameter set may be one of a VPS, SPS, PPS, and PH. The parameter indication may be one of the prediction indications or one of the partitioning indications included in the parameter set.

The parameter indication may be a bit-depth indication in the SPS. The bit-depth indication may indicate a bit-depth of multiple image samples in each of a luma array and a chroma array. The bit-depth indication may be a first SPS indication sps_bitdepth_minus8. Therefore, the bit-depth of the multiple image samples may be the picture parameter derived by adding eight to the first SPS indication sps_bitdepth_minus8.

The parameter indication may be a chroma format indication in the SPS. The chroma format indication may indicate a chroma sampling structure of the chroma array. The chroma sampling structure may be the picture parameter of the chroma format indication. The chroma format indication may be a second SPS indication sps_chroma_format_idc. Therefore, a location relationship between multiple luma samples and multiple chroma samples may be derived based on the second SPS indication sps_chroma_format_idc.

The decoder module 124 may determine the maximum constraint indication included in the general constraints information (GCI) of the bitstream. The constraint indications included in the GCI may be multiple general constraint indications, each indicating that one of different constraints is imposed on the video data or that there is no constraint imposed on the video data. The maximum constraint indication may be one of the general constraint indications, and the multiple indication values of the maximum constraint indication may indicate different maximum values of the parameter indication included in the parameter set.

The maximum constraint indication may be a maximum bit-depth constraint indication in the GCI. The maximum bit-depth constraint indication may indicate a maximum value of the bit-depth indication sps_bitdepth_minus8. For example, the maximum bit-depth constraint indication may be one of a first maximum bit-depth constraint indication gci_max_bitdepth_minus8_constraint_idc_plus1 and a second maximum bit-depth constraint indication gci_sixteen_minus_max_bitdepth_constraint_idc.

The maximum constraint indication may be a maximum chroma format constraint indication in the GCI. The maximum chroma format constraint indication may indicate a maximum value of the chroma format indication sps_chroma_format_idc. For example, the maximum chroma format constraint indication may be one of a first maximum chroma format constraint indication gci_max_chroma_format_constraint_idc_plus1 and a second maximum chroma format constraint indication gci_three_minus_max_chroma_format_constraint_idc.

At block 430, the decoder module 124 determines whether the maximum constraint indication is equal to zero. The method 400 may proceed to block 440 when the decoder module 124 determines that the maximum constraint indication is not equal to zero. The method 400 may proceed to block 450 when the decoder module 124 determines the maximum constraint indication is equal to zero.

The decoder module 124 determines an indication value of the maximum constraint indication. Since the maximum constraint indication is used for determining the maximum value of the parameter indication, the decoder module 124 may determine the maximum value of the parameter indication based on the indication value of the maximum constraint indication.

The indication value of the maximum constraint indication may be in a range of 0 to a maximum indication number. When the indication value of the maximum constraint indication is equal to zero, the maximum constraint indication may not impose the constraint on the parameter indication. When the indication value of the maximum constraint indication is greater than zero and less than or equal to the maximum indication number, the maximum constraint indication may impose a corresponding constraint on the parameter indication. In addition, the maximum indication number may be equal to the number of the constraint condition, so there may be no redundant values for the maximum constraint indication. Furthermore, the maximum constraint indication equal to zero specifies no constraint. Thus, the decoding efficiency may be increased since the decoder may simultaneously check each bit of the maximum constraints indication to directly determine whether each bit of the maximum constraint indication is equal to zero.

When the maximum constraint indication is the maximum bit-depth constraint indication, the indication value of the maximum bit-depth constraint indication may be in the range of zero to eight. In other words, the maximum indication number is equal to eight. In addition, when the indication value of the maximum bit-depth constraint indication is equal to zero, the maximum bit-depth constraint indication may not impose the constraint on the bit-depth indication in the parameter set.

When the maximum constraint indication is the maximum chroma format constraint indication, the indication value of the maximum chroma format constraint indication may be in the range of zero to the maximum indication number. In addition, when the indication value of the maximum chroma format constraint indication is equal to zero, the maximum chroma format constraint indication may not impose the constraint on the chroma format indication in the parameter set.

At block 440, the decoder module 124 determines the maximum value of the parameter indication based on the maximum constraint indication. When the indication value of the maximum constraint indication is greater than zero, the decoder module 124 may determine the maximum value of the parameter indication of the one or more image frames based on the maximum constraint indication.

When the maximum constraint indication is the first maximum bit-depth constraint indication gci_max_bitdepth_minus8_constraint_idc_plus1, the decoder module 124 may derive the maximum value of the first SPS indication sps_bitdepth_minus8 by subtracting one from the indication value of the first maximum bit-depth constraint indication. When the maximum constraint indication is the second maximum bit-depth constraint indication gci_sixteen_minus_max_bitdepth_constraint_idc, the decoder module 124 may derive the maximum value of the first SPS indication sps_bitdepth_minus8 by subtracting the indication value of the first maximum bit-depth constraint indication from sixteen.

When the maximum constraint indication is the first maximum chroma format constraint indication gci_max_chroma_format_constraint_idc_plus1, the decoder module 124 may derive the maximum value of the second SPS indication sps_chroma_format_idc by subtracting one from the indication value of the first maximum chroma format constraint indication. When the maximum constraint indication is the second maximum chroma format constraint indication gci_three_minus_max_chroma_format_constraint_idc, the decoder module 124 may derive the maximum value of the second SPS indication sps_chroma_format_idc by subtracting the indication value of the second maximum chroma format constraint indication from three.

At block 450, the decoder module 124 determines that the maximum constraint indication does not impose a constraint on the maximum value of the parameter indication. When the indication value of the maximum constraint indication is equal to zero, the decoder module 124 may determine that the indication value of the maximum constraint indication may not influence the maximum value of the parameter indication of the one or more image frames.

When the indication value of the maximum bit-depth constraint indication is equal to zero, the decoder module 124 may determine that the indication value of the maximum bit-depth constraint indication may not influence the maximum value of the bit-depth indication of the one or more image frames in the video sequence corresponding to the SPS. Thus, the maximum bit-depth constraint indication does not impose a constraint on the maximum value of the bit-depth indication in SPS.

When the indication value of the maximum chroma format constraint indication is equal to zero, the decoder module 124 may determine that the indication value of the maximum chroma format constraint indication may not influence the maximum value of the chroma format indication of the one or more image frames in the video sequence corresponding to the SPS. Thus, the maximum chroma format constraint indication does not impose a constraint on the maximum value of the chroma format indication in SPS.

At block 460, the decoder module 124 reconstructs one or more image frames based on the picture parameter.

When the parameter indication is the bit-depth indication in the SPS, the one or more image frames in the video sequence may be reconstructed based on the bit-depth. When the parameter indication is the chroma format indication in the SPS, the one or more image frames in the video sequence may be reconstructed based on the chroma format. The method/process 400 may then end.

Figure 5:
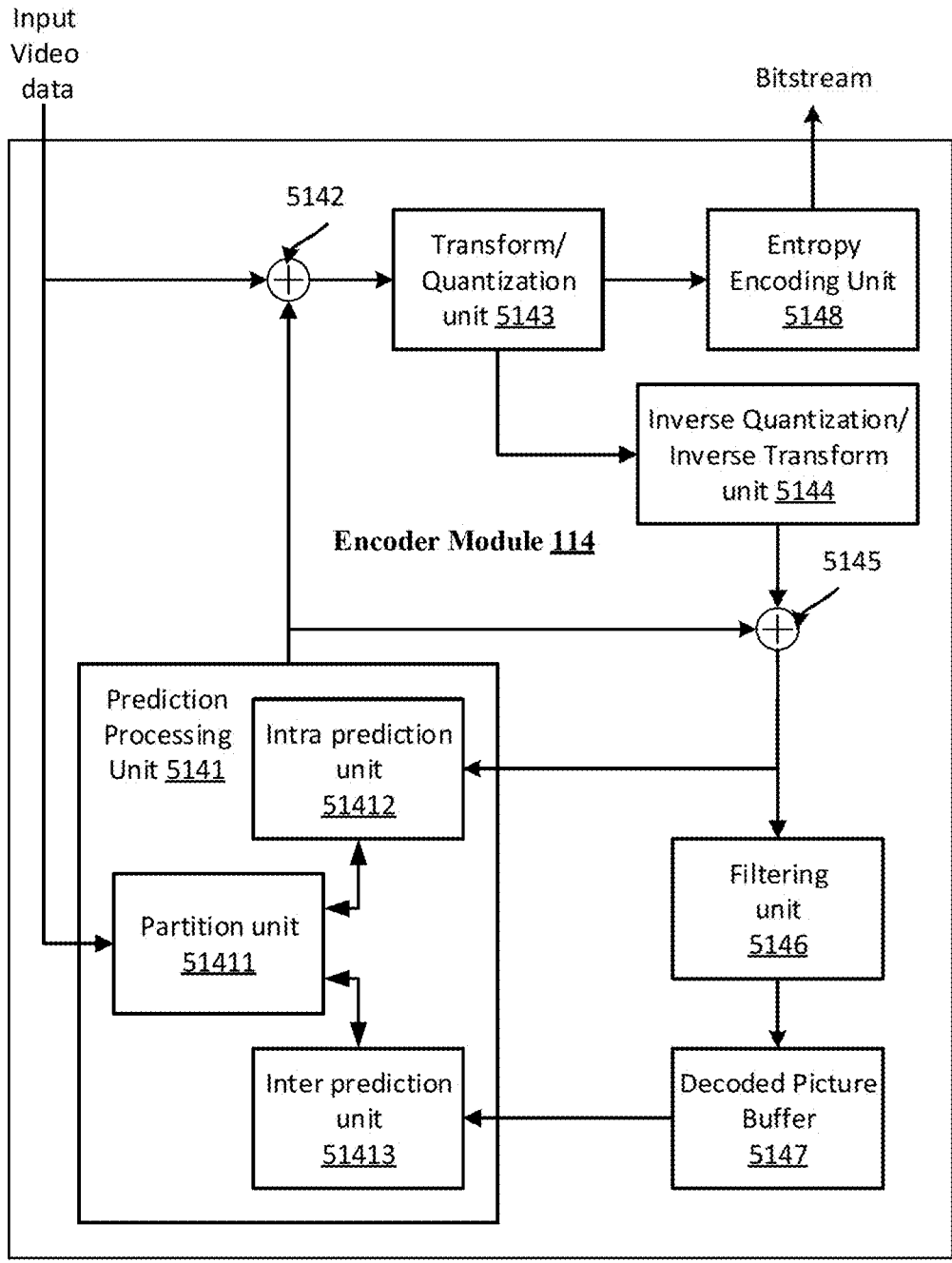
FIG. 5 is a block diagram illustrating an encoder module of the first electronic device illustrated in FIG. 1, in accordance with one or more example implementations of the present disclosure.

FIG. 5 is a block diagram illustrating an encoder module 114 of the first electronic device 110 illustrated in FIG. 1, in accordance with one or more example implementations of the present disclosure. The encoder module 114 may include a prediction processor (e.g., a prediction processing unit 5141), at least a first summer (e.g., a first summer 5142) and a second summer (e.g., a second summer 5145), a transform/quantization processor (e.g., a transform/quantization unit 5143), an inverse quantization/inverse transform processor (e.g., an inverse quantization/inverse transform unit 5144), a filter (e.g., a filtering unit 5146), a decoded picture buffer (e.g., a decoded picture buffer 5147), and an entropy encoder (e.g., an entropy encoding unit 5148). The prediction processing unit 5141 of the encoder module 114 may further include a partition processor (e.g., a partition unit 51411), an intra prediction processor (e.g., an intra prediction unit 51412), and an inter prediction processor (e.g., an inter prediction unit 51413).

The encoder module 114 may receive the source video and encode the source video to output a bitstream. The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 5141 may receive a current image block of a specific one of the image frames. The current image block may be the luminance block or one of the chrominance blocks in the specific image frame.

The partition unit 51411 may divide the current image block into multiple block units. The intra prediction unit 51412 may perform intra-predictive coding of a current block unit relative to one or more neighboring blocks in the same frame as the current block unit in order to provide spatial prediction. The inter prediction unit 51413 may perform inter-predictive coding of the current block unit relative to one or more blocks in one or more reference image blocks to provide temporal prediction.

The prediction processing unit 5141 may select one of the coding results generated by the intra prediction unit 51412 and the inter prediction unit 51413 based on a mode selection method, such as a cost function. The mode selection method may be a rate-distortion optimization (RDO) process.

The prediction processing unit 5141 may determine the selected coding result and provide a predicted block corresponding to the selected coding result to the first summer 5142 for generating a residual block and to the second summer 5145 for reconstructing the encoded block unit. The prediction processing unit 5141 may further provide syntax elements, such as motion vectors, intra-mode indicators, partition information, and/or other syntax information, to the entropy encoding unit 5148.

The intra prediction unit 51412 may intra-predict the current block unit. The intra prediction unit 51412 may determine an intra prediction mode directed toward a reconstructed sample neighboring the current block unit in order to encode the current block unit.

The intra prediction unit 51412 may encode the current block unit using various intra prediction modes. The intra prediction unit 51412 of the prediction processing unit 5141 may select an appropriate intra prediction mode from the selected modes. The intra prediction unit 51412 may encode the current block unit using a cross-component prediction mode to predict one of the two chroma components of the current block unit based on the luma components of the current block unit. The intra prediction unit 51412 may predict a first one of the two chroma components of the current block unit based on the second of the two chroma components of the current block unit.

The inter prediction unit 51413 may inter-predict the current block unit as an alternative to the intra prediction performed by the intra prediction unit 51412. The inter prediction unit 51413 may perform motion estimation to estimate motion of the current block unit for generating a motion vector.

The motion vector may indicate a displacement of the current block unit within the current image block relative to a reference block unit within a reference image block. The inter prediction unit 51413 may receive at least one reference image block stored in the decoded picture buffer 5147 and estimate the motion based on the received reference image blocks to generate the motion vector.

The first summer 5142 may generate the residual block by subtracting the prediction block determined by the prediction processing unit 5141 from the original current block unit. The first summer 5142 may represent the component or components that perform this subtraction.

The transform/quantization unit 5143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 5143 may perform a scan of the matrix including the quantized transform coefficients. Alternatively, the entropy encoding unit 5148 may perform the scan.

The entropy encoding unit 5148 may receive multiple syntax elements from the prediction processing unit 5141 and the transform/quantization unit 5143 including a quantization parameter, transform data, motion vectors, intra modes, partition information, and/or other syntax information. The entropy encoding unit 5148 may encode the syntax elements into the bitstream.

The entropy encoding unit 5148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 5144 may apply inverse quantization and inverse transformation to reconstruct the residual block in the pixel domain for later use as a reference block. The second summer 5145 may add the reconstructed residual block to the prediction block provided by the prediction processing unit 5141 in order to produce a reconstructed block for storage in the decoded picture buffer 5147.

The filtering unit 5146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 5145.

The decoded picture buffer 5147 may be a reference picture memory that stores the reference block to be used by the encoder module 114 to encode video, such as in intra-coding or inter-coding modes. The decoded picture buffer 5147 may include a variety of memory devices, such as DRAM (e.g., including SDRAM), MRAM, RRAM, or other types of memory devices. The decoded picture buffer 5147 may be on-chip with other components of the encoder module 114 or off-chip relative to those components.

The encoder module 114 may receive video data and use multiple prediction modes to predict multiple image frames in the video data. In the implementation, the video data may be a video and the prediction modes may be indicated by multiple flags and multiple indices. In addition, the encoder module 114 may signal a list of constraint flags and non-flag syntax elements indicating specific constraint properties of multiple pictures in general constraints information.

The encoder module 114 may determine a maximum constraint indication included in general constraints information for the video data and used for determining a maximum value of a parameter indication included in a parameter set for the video data. The encoder module 114 may determine whether the maximum constraint indication is greater than zero. When the maximum constraint indication is greater than zero, the encoder module 114 may determine a maximum value of the parameter indication based on the maximum constraint indication for encoding the parameter indication. When the maximum constraint indication is equal to zero, the encoder module 114 may determine that the maximum constraint indication does not impose a constraint on the maximum value of the parameter indication. Therefore, the encoder module 114 may encode the parameter indication without considering the indication value of the maximum constraint indication. Then, the encoder module 114 may encode the image frames based on a picture parameter indicated by the picture indication for generating a bitstream and reconstruct the image frames based on the picture parameter as a reference frame for reconstructing other frames in the video data. Therefore, the encoder module 114 may determine the maximum constraint indication for the methods 300 and 400 as shown in FIGS. 3 and 4.

The disclosed implementations are to be considered in all respects as illustrative and not restrictive. It should also be understood that the present disclosure is not limited to the specific disclosed implementations but that many rearrangements, modifications, and substitutions are possible without departing from the scope of the present disclosure.

What is claimed is:

1. A method of encoding video data by an electronic device, the method comprising:
   receiving the video data; and
   determining, for general constraints information of the video data, a maximum constraint indicator used for determining a maximum value of a parameter included in a sequence parameter set (SPS) for the video data, wherein the maximum constraint indicator does not impose a constraint on the maximum value of the parameter when the maximum constraint indicator is equal to zero.

2. The method according to claim 1, wherein the parameter in the SPS comprises a bit-depth parameter sps_bit-depth_minus8 when the maximum constraint indicator is a maximum bit-depth constraint indicator.

3. The method according to claim 2, wherein a value of the maximum bit-depth constraint indicator is in a range of zero to eight.

4. The method according to claim 1, wherein the parameter in the SPS comprises a chroma format parameter sps_chroma_format_idc when the maximum constraint indicator is a maximum chroma format constraint indicator.

5. The method according to claim 4, wherein a value of the maximum chroma format constraint indicator is in a range of zero to two.

6. The method according to claim 1, wherein the maximum value of the parameter is calculated based on the maximum constraint indicator and a constant value when the maximum constraint indicator is greater than zero.

7. The method according to claim 6, wherein the maximum value of the parameter is calculated by subtracting the constant value from the maximum constraint indicator when the maximum constraint indicator is greater than zero.

8. An electronic device for encoding video data, the electronic device comprising:
   at least one processor; and
   at least one non-transitory computer-readable medium coupled to the at least one processor and storing one or more computer-executable instructions that, when executed by the at least one processor, cause the electronic device to:
   receive the video data; and
   determine, for general constraints information of the video data, a maximum constraint indicator used for determining a maximum value of a parameter included in a sequence parameter set (SPS) for the video data, wherein the maximum constraint indicator does not impose a constraint on the maximum value of the parameter when the maximum constraint indicator is equal to zero.

9. The electronic device according to claim 8, wherein the parameter in the SPS comprises a bit-depth parameter sps_bitdepth_minus8 when the maximum constraint indicator is a maximum bit-depth constraint indicator.

10. The electronic device according to claim 9, wherein a value of the maximum bit-depth constraint indicator is in a range of zero to eight.

11. The electronic device according to claim 8, wherein the parameter in the SPS comprises a chroma format parameter sps_chroma_format_idc when the maximum constraint indicator is a maximum chroma format constraint indicator.

12. The electronic device according to claim 11, wherein a value of the maximum chroma format constraint indicator is in a range of zero to two.

13. The electronic device according to claim 8, wherein the maximum value of the parameter is calculated based on the maximum constraint indicator and a constant value when the maximum constraint indicator is greater than zero.

14. The electronic device according to claim 13, wherein the maximum value of the parameter is calculated by subtracting the constant value from the maximum constraint indicator when the maximum constraint indicator is greater than zero.

15. A method of encoding video data by an electronic device, the method comprising:

receiving the video data;

determining a parameter to be encoded into a sequence parameter set (SPS) of a bitstream, the parameter indicating a picture parameter of a plurality of image frames in a video sequence of the video data; and determining a maximum constraint indicator to be encoded into general constraints information of the bitstream, wherein the maximum constraint indicator does not impose a constraint on the parameter when the maximum constraint indicator is equal to zero.

16. The method according to claim 15, wherein a maximum value of the parameter is determined based on the maximum constraint indicator when the maximum constraint indicator is greater than zero.

\* \* \* \* \*